(12) United States Patent
Merriman et al.

(10) Patent No.: US 8,990,159 B2
(45) Date of Patent: Mar. 24, 2015

(54) SYSTEMS AND METHODS FOR DURABLE DATABASE OPERATIONS IN A MEMORY-MAPPED ENVIRONMENT

(71) Applicant: MongoDB, Inc., New York, NY (US)

(72) Inventors: Dwight Merriman, New York, NY (US); Eliot Horowitz, New York, NY (US); Mathias Stearn, New York, NY (US)

(73) Assignee: MongoDB, Inc., New York, NY (US)

( * ) Notice: Subject to any disclaimer, the term of this patent is extended or adjusted under 35 U.S.C. 154(b) by 16 days.

(21) Appl. No.: 13/666,266

(22) Filed: Nov. 1, 2012

(65) Prior Publication Data

US 2013/0110771 A1 May 2, 2013

Related U.S. Application Data

(60) Provisional application No. 61/554,164, filed on Nov. 1, 2011.

(51) Int. Cl.
*G06F 17/30* (2006.01)
*G06F 11/14* (2006.01)
(52) U.S. Cl.
CPC ...... *G06F 17/30368* (2013.01); *G06F 11/1471* (2013.01)
USPC .......................................................... 707/638
(58) Field of Classification Search
CPC .......... G06F 17/3007; G06F 17/30067; G06F 17/30129; G06F 17/30132; G06F 17/3023; G06F 17/30233
USPC .......... 707/717, 648, 649, 657, 999.205, 610, 707/619, 638
See application file for complete search history.

(56) References Cited

U.S. PATENT DOCUMENTS

| | | | |
|---|---|---|---|
| 5,903,898 A * | 5/1999 | Cohen et al. .................. | 707/648 |
| 2002/0073082 A1 * | 6/2002 | Duvillier et al. ................. | 707/3 |
| 2003/0074378 A1 * | 4/2003 | Midgley et al. ............... | 707/204 |
| 2007/0226438 A1 * | 9/2007 | Erofeev ........................ | 711/162 |
| 2012/0158680 A1 * | 6/2012 | Shaughnessy ................ | 707/703 |

OTHER PUBLICATIONS

Lamb, Charles, et al. "The ObjectStore database system." Communications of the ACM 34.10 (1991): 50-63.*
Satyanarayanan, Mahadev, et al. "Coda: A highly available file system for a distributed workstation environment." Computers, IEEE Transactions on 39.4 (1990): 447-459.*

* cited by examiner

*Primary Examiner* — Usmaan Saeed
*Assistant Examiner* — Nan Hutton
(74) *Attorney, Agent, or Firm* — Lando & Anastasi, LLP

(57) ABSTRACT

A durable memory-mapped database system includes a first memory-mapped view of a database, a second memory-mapped view of the database, a journal buffer and a journal. The first memory-mapped view of the database is a protected view and includes copies of a plurality of datafiles from the database. The second memory-mapped view of the database is a write view and includes copies of the plurality of datafiles. The journal buffer is a buffer in random access memory configured to record datafile updates. The journal is configured to periodically receive recorded datafile updates from the journal buffer.

19 Claims, 9 Drawing Sheets

SYSTEMS AND METHODS FOR DURABLE DATABASE OPERATIONS IN A MEMORY-MAPPED ENVIRONMENT

BACKGROUND

Conventional database architectures are designed to provide for reliable processing of database transactions, such as read and write operations performed on the database. One property of database architecture designs is durability. In a durable database, when a transaction has been committed, it will not be lost if the system crashes. One way to ensure durability, is to write all changes directly to the datafiles in the database. However, accessing the database directly for every write is slow and results in poor system performance. To increase performance, conventional database systems acquire a segment of the random access memory (RAM) of a computer system and designate the segment as a database-specific page cache. The operating system does not access the page cache, which is accessed only by the database system. Conventional database systems use the page cache as a buffer to temporarily store changes. In a typical implementation, the page cache is periodically written to the datafiles. However, data stored in RAM is lost upon a power failure or system crash.

Further, in conventional relational database systems, durability is achieved by also storing changes made to datafiles in a buffer on the hard disk called a redo log or journal. Generally, incremental changes stored in the page cache are written to the redo log at regular intervals, more frequently than the changes are written to the datafiles. The database system determines when data from the page cache is written to the datafiles. When the data stored in the page cache is written to the datafiles, the page cache and the journal are flushed. If the system crashes while the database is being updated, the journal provides a back-up of the data stored in the page cache to ensure that minimal data is lost.

SUMMARY

In conventional memory-mapped database systems, changes to the datafiles are stored in memory-mapped files in the file system cache in RAM, and there is no page cache or journal. Memory-mapped database systems store data directly in the file system cache instead of segmenting RAM to create a page cache because using the file system cache directly increases the efficiency of the database system.

However, unlike a page cache, which is only accessed by the database system, the operating system may access the file system cache at any time to write cached data to the datafiles and delete data from the cache. Thus, if a journal were added to a conventional memory-mapped database system, and changes to the memory-mapped files stored in the file system cache were also written to the journal, the operating system may copy updated memory-mapped files to the database before the updated files are added to the journal. There would be no way to ensure that changes were added to the journal before the operating system copied the updated memory-mapped files from the cache to the database. Thus, if a set of changes was written from the memory-mapped files in the file system cache to the database and then the system crashed before the set of changes was written to the journal, the journal would contain old data and writing the data in the journal to the database upon restart would corrupt the datafiles.

As described above, when changes are made in the file system cache, there is no way for the database system to ensure that they are written to a journal before they are stored in the datafiles. Furthermore, instructing the database system to save changes in the journal before updating the memory-mapped files in the file system cache would significantly decrease system performance.

According to one embodiment of the invention, to enable journaling in a memory-mapped database system, two sets of memory-mapped files are stored in the file system cache. One set of memory-mapped files is designated as a protected view that the operating system does not access, while the other set of memory-mapped files is a write view that is accessible by the operating system and may be written to the datafiles at any time. Changes to the memory-mapped database system are initially made to the protected set of memory-mapped files, and backed up in a journal. Changes to the protected view are then written to the write view.

Aspects and embodiments are directed to using a memory-mapped database system with two memory-mapped views to allow journaling and enhance durability and reliability. The first memory-mapped view is a protected view which includes memory-mapped files which a user can update and read. Updates to the first memory-mapped view are written to a journal. The second memory-mapped view includes memory-mapped files and is updated after the journal is updated. The datafiles in physical memory are updated from the files in the second memory-mapped view.

According to one aspect, a computer-implemented method for creating durability in a memory-mapped database system includes providing a first memory-mapped view of a database, wherein the first memory-mapped view is a protected view, providing a second memory-mapped view of the database, wherein the second memory-mapped view is a write view, recording a plurality of datafile updates to the first memory-mapped view, recording the plurality of datafile updates in a journal buffer in random access memory, and writing, after a first time interval, at least one of the plurality of datafile updates in the journal buffer to a journal.

In one embodiment, the computer-implemented method also includes recording a plurality of write intents indicating at least one updated file location corresponding to the plurality of datafile updates. In another embodiment, the computer-implemented method also includes recording the at least one datafile update to the second memory-mapped view, and updating the database with the at least one datafile update to the second memory-mapped view. In a further embodiment, the plurality of datafile updates include datafile updates to a single datafile, and writing at least one of the plurality of datafile updates to the journal comprises writing the single datafile to the journal.

According to one embodiment, the first memory-mapped view of the database is a readable view. In another embodiment, the second memory-mapped view of the database is a write-only view. In a further embodiment, the first memory-mapped view is protected from operating system access. According to another embodiment, the first memory-mapped view of the database includes a portion of datafiles in the database, and the computer-implemented method further includes updating the datafiles included in the first memory-mapped view of the database. According to a further embodiment, the second memory-mapped view of the database includes a portion of datafiles in the database, and the computer-implemented method further includes updating the datafiles included in the second memory-mapped view of the database.

According to another embodiment, recording a plurality of datafile updates to the first memory-mapped view includes recording the plurality of datafile updates in random access memory. In a further embodiment, the computer-implemented method further includes remapping the first memory-mapped view to include the plurality of datafile updates in random access memory. In one embodiment, the computer-implemented method further includes providing an acknowledgement after writing at least one of the plurality of datafile updates to the journal. According to one embodiment, the journal is stored on a hard drive.

According to another aspect, a durable memory-mapped database system includes a first memory-mapped view of a database, a second memory-mapped view of a database, a journal buffer, and a journal. The first memory-mapped view of a database includes copies of a plurality of datafiles from the database, and the first memory-mapped view is a protected view. The second memory-mapped view of the database includes copies of the plurality of datafiles, and the second memory-mapped view is a write view. The journal buffer is stored in random access memory and configured to record datafile updates. The journal is configured to periodically receive recorded datafile updates from the journal buffer.

According to one embodiment, the durable memory-mapped database system also includes a write intent file configured to record at least one updated file location corresponding to at least one of the datafile updates. According to another embodiment, the first memory-mapped view is a copy-on-write view. According to a further embodiment, the first and second memory-mapped views are stored in a file system cache. In one embodiment, the journal is stored in a page cache.

According to one aspect, a computer-implemented method for creating durability in a memory-mapped database system includes performing a plurality of write operations on a first memory-mapped view of a database, wherein the first memory-mapped view is a protected view, saving a location of at least one of the plurality of write operations to a write intent file, saving the plurality of write operations to a journal buffer, periodically recording, after a first time interval, at least a subset of the plurality of write operations in a journal, and performing, after a second time interval, the plurality of write operations on a second memory-mapped view of the database, where in the second memory-mapped view is a write view.

According to one embodiment, the first memory-mapped view of the database includes a portion of datafiles in the database, and the computer-implemented method further includes updating the datafiles included in the first memory-mapped view. According to another embodiment, the computer-implemented method also includes providing an acknowledgement after recording the subset of the plurality of write operations in the journal.

BRIEF DESCRIPTION OF THE FIGURES

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Systems and methods are provided herein for using journaling with a memory-mapped database to enhance database durability and reliability. Memory-mapped database systems allow for much faster database access, for example, for reading or writing to the database, than is possible with conventional relational databases. Memory-mapped database systems are fast because they use a set of memory-mapped files stored in a segment of virtual memory. The memory-mapped files may be stored in local memory, such as the file system cache, on the local disk. The memory-mapped files are directly correlated with at least part of a main database stored on a hard drive, server, cloud-based storage, or other storage medium, and the operating system can reference the memory-mapped files using a file descriptor. The correlation between the memory-mapped files and the main database allows users or applications to treat the memory-mapped files as if they were the main database itself.

Figure 1:
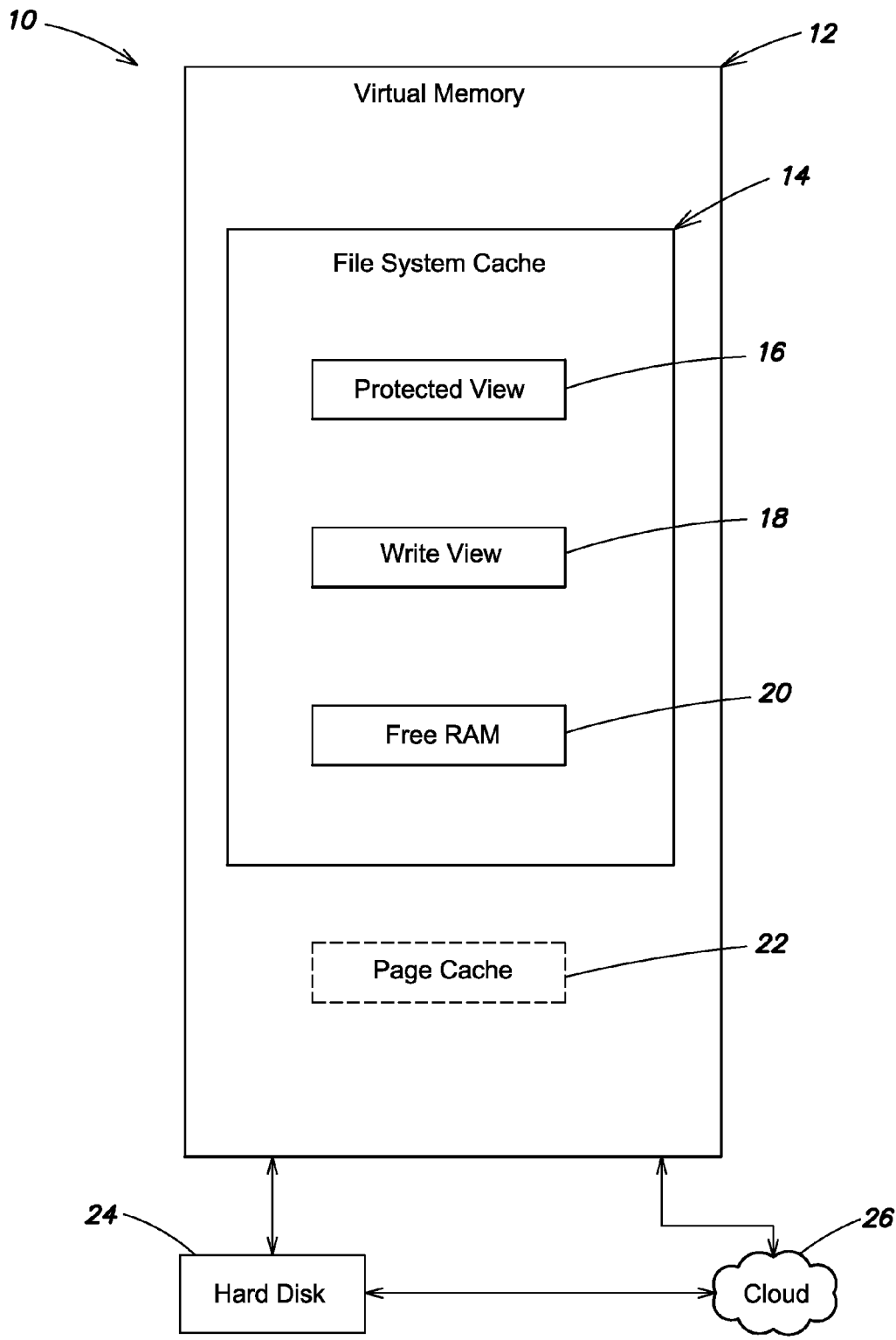
FIG. 1 is a block diagram of a computer memory architecture.

An exemplary computer architecture 10 on which the memory-mapped database system may be implemented is shown in FIG. 1. The computer includes a virtual memory 12, which includes a file system cache 14. When a conventional relational database is run on the computer architecture 10, the virtual memory 12 is segmented, and part of the RAM is designated a page cache 22, accessible only by the database system. In a memory-mapped database system, the file system cache 14 is used to store a memory-mapped view of at least some of the database datafiles. In the memory-mapped database system as described with respect to FIG. 2 below, the file system cache 14 includes two sets of memory-mapped files: the protected files 16 and the write files 18. The remainder of the file system cache 14 is free RAM 20.

The computer architecture 10 also includes a hard disk 24, and accessing files from the hard disk 24 takes a much longer time than accessing files in virtual memory 12. Thus, the database system copies frequently accessed files to the virtual memory 12. In one example, the database may be stored remotely, and the computer may access datafiles from a cloud-based storage 26. In one example, a cloud-based storage system such as the EC2 platform, available from Amazon.com, Seattle, Wash. may be used, among other cloud-based storage systems. Datafiles from the cloud 26 may be stored directly to virtual memory 12, or they may be copied to the hard disk 24. Updates to datafiles from the cloud 26 will be saved back to the cloud 26.

Figure 2:
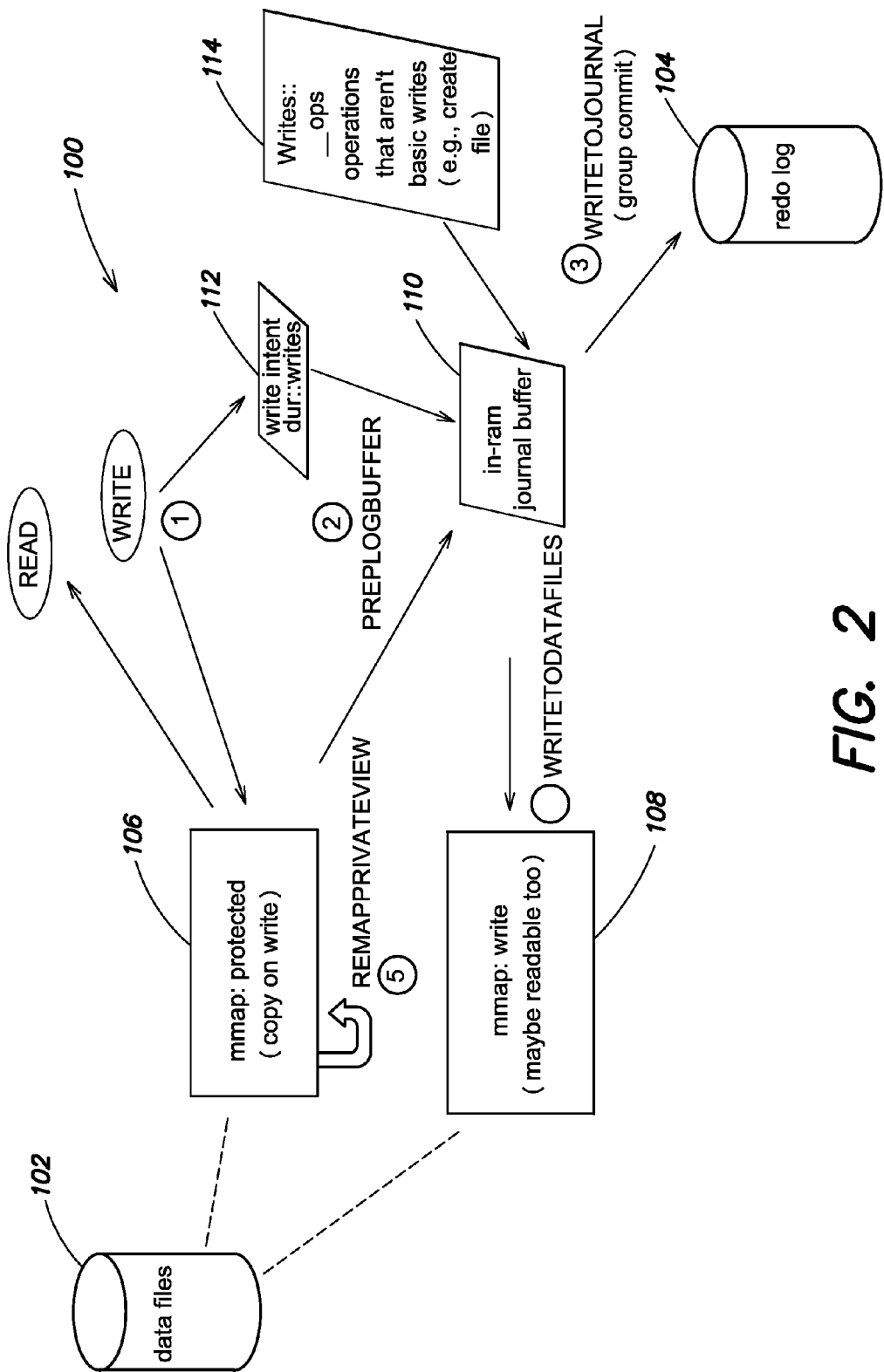
FIG. 2 is a block diagram of a memory-mapped database and journal according to aspects of the present invention.

FIG. 2 is a block diagram of a memory-mapped database system including a main database 102 and two memory-mapped views 106 and 108, according to an embodiment of the invention. The two memory-mapped views of the database 102 include a protected view 106 and a write view 108. Each of the memory-mapped views 106 and 108 include memory-mapped files that are mapped to some or all of the data files in the database 102. According to one embodiment, the main database 102 is stored on a hard disk, while the memory-mapped files in the memory mapped views 106 and 108 are stored in a file system cache.

Figure 6:
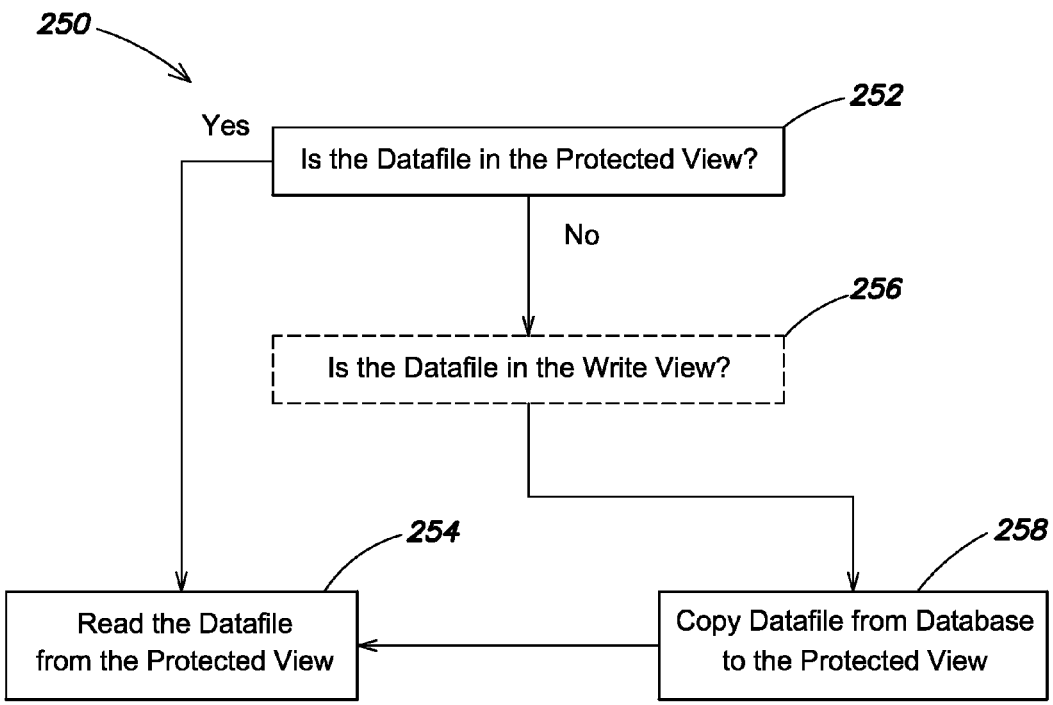
FIG. 6 is a flow chart of a method of reading data from a memory-mapped database according to aspects of the present invention.

The protected memory-mapped view 106 is accessed for any read request, and is also updated with any write command. Thus, when a user writes to the database 102, the write is initially performed as a copy-on-write only on the memory-mapped files located within the protected memory-mapped view 106, without accessing or modifying the data files in the main database 102. Because the data in the protected memory-mapped view 106 is updated with write commands that have not been written to the database 102 or to a journal (as discussed in greater detail below), read requests access and read uncommitted data in the protected memory-mapped view 106, as described in greater detail with respect to FIG. 6.

According to one embodiment, every time a copy-on-write is performed on the protected view 106, random access memory (RAM) or other high-speed storage device is used to store the written data. Using RAM allows for high speed performance. In one example, writing to RAM allows about 10,000 writes per second. However, in order to avoid running out of space in free RAM, the protected view 106 may be periodically remapped, flushing the free RAM and saving the writes to the write view 108. The operating system may save the write view 108 to the datafiles in the main database 102 at any time. In one embodiment, the protected view 106 is remapped every few milliseconds, as discussed in greater detail below.

For large files such as databases, using a memory-mapped database system increases system performance by increasing input and output performance. Accessing memory-mapped files in the file system cache is faster than reading and writing directly to the main database because making changes to local memory is orders of magnitude faster than changing the main database directly. Furthermore, accessing the file system cache is faster than creating a separate page cache, which is accessible only by the database system. However, a disadvantage of using memory-mapped files for modifying a main database is that there is no page cache of changes made to memory-mapped files, so changes may be accessed and flushed to the database by the operating system. Thus, conventional journaling techniques cannot be used to provide durability to the database system while also maintaining efficiency, since there is no way to ensure that changes to the memory-mapped files will be saved in the journal before the operating system flushes the cache and the changes are saved in the database. Thus, if the system crashes, changes to the memory-mapped files are lost. This results in a lack of durability in memory-mapped databases. Thus, aspects and embodiments are directed to increasing the durability of memory-mapped database systems by creating two separate memory-mapped views 106 and 108 to enable journaling.

An exemplary journaling system is shown in FIG. 2. User operations are performed on the protected view 106, which is not accessed by the operating system. The journal 104 may be used to record write operations before they are recorded in the write view 108 and written to the datafiles in the database 102, thereby increasing the durability of the database system. The block diagram 100 also shows a journal buffer 110, a write intent file 112 and a write operation file 114, described below.

Figure 3:
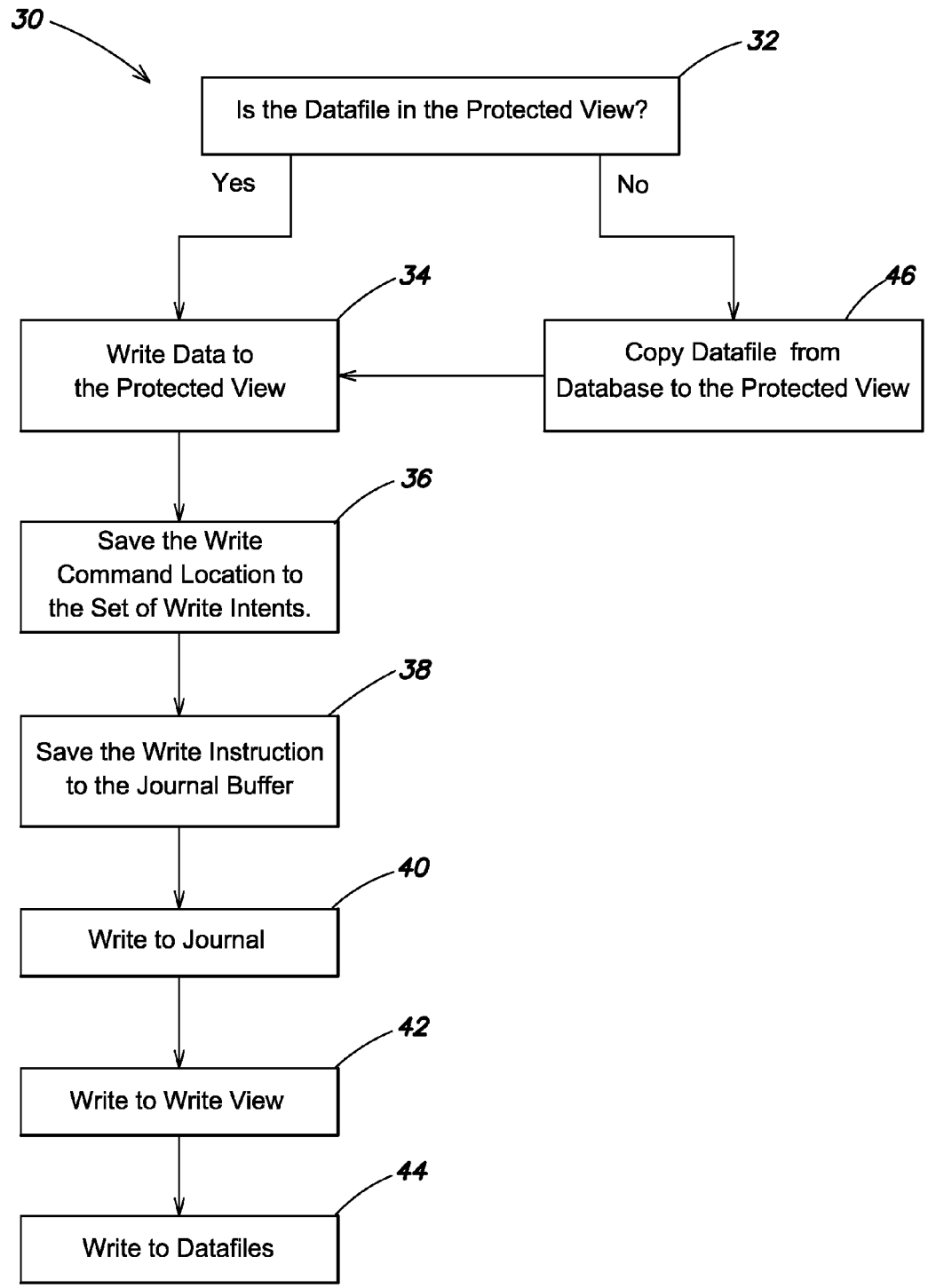
FIG. 3 is a flow chart of a method of writing data to a memory-mapped database according to aspects of the present invention.

Referring to FIG. 3, an exemplary method 30 of writing data to a memory-mapped database system is shown, and described below with continued reference to FIG. 2. When a user enters a write command, at step 32, the virtual memory manager determines if the datafile the user is writing to is one of the memory-mapped files in the protected view 106. If the datafile is in the protected view 106, at step 34, the write operation is performed on the memory-mapped file in the protected view 106. If the datafile is not in the protected view 106, at step 46, the datafile is copied from the database 102 to the protected view 106, and then the write operation is performed on the memory-mapped file in the protected view 106.

Additionally, at step 36, a write intent is recorded in a write intent file 112 stored in free RAM. A write intent is an indication by the computer system that there is a pending write operation to be performed at a specified storage location. The write intent includes information regarding the number of bytes written to a specified pointer address, but generally does not include information regarding the data written to the specified address. A set of write intents 112 is stored in the write intent file 112 in RAM. According to one feature, if the same pointer address is updated many times before being committed to the journal 104, the set of write intents 112 includes only one write intent for that the selected pointer address. Because the set of write intents 112 is stored in RAM, it is quickly and easily accessible, resulting in high efficiency. According to one feature, the set of write intents 112 is used to determine which writes to store in the journal 104. For example, if multiple writes are made to the same file, only the most recent write will be stored in the journal 104.

Additionally, when a write command is entered, at step 38, the write operation is recorded in a journal buffer 110 stored in RAM. The journal buffer 110 stores the instruction, the data, and the file location to which the data was written. According to one feature, writing to the journal buffer 110 is fast since it is stored in RAM, and in one example, the journal buffer 110 can log about 10 writes per millisecond.

At periodic time intervals, data from the journal buffer 110 is committed to the journal 10, at step 40. In one embodiment, the journal 104 includes copies of write instructions that have not yet been written to the write view 108 or the datafiles in the main database 102. In various examples, the journal 104 is updated about every 10 ms, about every 20 ms, about every 30 ms, about every 40 ms, about every 50 ms, about every 75 ms, or about every 100 ms. In other embodiments, different time intervals can be implemented.

According to one feature, if a selected region of the memory-mapped database is written to more than once during the time interval, only the most recent data is written to the journal 104. Thus, only the most recent of several writes to a selected region is written to the journal 104. In one example, when a group of data from the journal buffer 110 is committed to the journal 104, it is called a group commit.

In one example, during a group commit interval (the period of time between journal 104 updates), a selected B-tree has ten keys added to it and two keys deleted from it. Thus, the B-tree was written to twelve times during the group commit interval, and twelve sets of B-tree data are stored in the journal buffer 110. However, only the most recent B-tree data is written to the journal 104. According to one feature, the data is written to the journal 104 from the journal buffer 110 using direct I/O, bypassing the memory-mapped files and the virtual memory manager.

According to one embodiment, the journal 104 includes multiple journal files. When a first journal file reaches a selected size, a second journal file is used to store journal buffer 110 downloads. In one example, when the first journal file is one gigabyte (GB) in size, the second journal file is created. In a further example, when the second journal file reaches 1 GB in size, a third journal file is created. In other examples, the second journal file is created when the first journal file reaches 500 MB in size, 1.5 GB in size, or 2 GB in size. In other embodiments, different journal file sizes can be implemented by the system.

According to one embodiment, the first journal file is deleted when the data it contains is written to the datafiles in the main database 102. Thus, at any given point in time, only a few journal files are present on disk. Furthermore, according to one embodiment, a clean shutdown of the system deletes all journal files. According to another embodiment, the journal 104 includes a last sequence number file indicating the number of the journal currently being used.

According to one embodiment, after data is written to the journal 104, an acknowledgement is returned to the user. In one example, the acknowledgment is an acknowledgement that the changes to the file have been saved and will be committed to the database even if the system crashes (an "fsync" acknowledgement). In another example, a "j:true" command is used, and the acknowledgment is only sent when data is on disk in the journal. In another embodiment, no acknowledgement is sent to the user after data is written to the journal 104, because there is a delay before an acknowledgement is sent, and thus acknowledgements can decrease performance. In one example, a user may choose whether or not the user would like to receive an acknowledgement.

According to one embodiment, a user can use a "get last error" command to determine whether recent writes were recorded in the journal 104. In one embodiment, after the journal 104 has been updated to include data from the journal buffer 110, the journal buffer 110 and the write intent file 112 are reset, such that they contain no data.

In one embodiment, the journal 104 stores data in a low level binary file format. According to one feature, a user may use a selected command line option to dump the journal in a human-readable format. According to one embodiment, a user may disable or enable journaling. According to another embodiment, when using replica sets, journaling may be enabled on some replica sets and disabled on other replica sets. The use of replica sets in database systems is described in U.S. patent application Ser. No. 12/977,563, which is assigned to the assignee of the present application and incorporated by reference herein.

According to one embodiment, the journal 104 includes preallocated files of a predetermined size. Using preallocated files may decrease journal write latency, increasing system performance. The preallocated files may be created before or during system startup. In various embodiments, the amount of space used for preallocated files may range from about 1 GB to about 5 GB in size. System startup may be delayed to preallocate the files. According to another embodiment, the preallocated files may be created using another instance of the memory-mapped database system and the preallocated files may then be moved to the instance of the memory-mapped database system being used before it begins journaling. For example, if a user had an instance of the memory-mapped database system running on port 27017, the user could start an instance of the memory-mapped database system on port 10000, preallocate journal files, kill the instance of the database system running on port 10000, and move the preallocated journal files to the instance of the database system running on port 27017.

Still referring to FIGS. 2 and 3, after the journal 104 has been successfully updated, at step 42, the write view 108 is similarly updated. In one embodiment, the write view 108 is updated with data from the journal buffer 110. In another embodiment, the write view is updated with data from the protected memory mapped view 106. According to one embodiment, the journal 104 may be updated multiple times before the write view 108 is updated, which may increase the durability of the database system while maintaining a high efficiency. After the write view 108 is updated, at step 44, the data may be written to the datafiles in the main database 102. If the system crashes after data has been written to the journal 104 but before it is written to the write view 108 or the database 102, data saved in the journal 104 is not lost. In particular, upon reboot, data from the journal 104 is written to the database 102.

As discussed above with respect to FIG. 1, the memory-mapped views 106 and 108 include memory-mapped files from the database 102, and the memory-mapped files are stored in the file system cache. For large databases, only part of the database 102 is stored in the memory-mapped files in the file system cache at any particular time. The virtual memory manager of the file system may determine which data files are stored in the memory-mapped files in the file system cache. In one example, when a user performs operations on a part of the database 102 that is not currently represented in the memory-mapped files of the protected view 106, the virtual memory manager replaces the least recently used memory-mapped files in the protected view 106 with memory-mapped files representing the more recently accessed portion of the database 102. According to one feature, the virtual memory manager ensures that the data in the datafiles being removed from the protected view 106 is in the main database 102.

The protected view 106 is periodically remapped to avoid running out of space in RAM. Remapping the protected view 106 flushes the RAM and saves the writes to the datafiles in the main database on the hard disk. In one embodiment, the protected view 106 is remapped every few milliseconds. For example, the protected view 106 may be remapped about every one half ms, about every 1 ms, about every 2 ms, about every 3 ms, about every 4 ms, about every 5 ms, about every 8 ms, about every 10 ms, or more than about every 10 ms. Remapping the entire protected view 106 at one time may cause a decrease in system performance.

Thus, in another embodiment, a portion of the protected view 106 is remapped at one time. Multiple portions of the protected view 106 may be remapped sequentially. When only a portion of the protected view 106 is remapped, remapping occurs more frequently, but since less data is remapped each time, there is a smaller effect on system performance. Because remapping occurs more frequently when remapping portions of the protected view 106, the small effect on system performance will be a more consistent effect. In one example, the protected view 106 is divided into ten portions, and each portion is sequentially remapped. In this example, instead of remapping the entire protected view 106 every 1 ms, a portion is remapped every 0.1 ms. According to various examples, portions of the protected view 106 may be remapped about every 0.05 ms, about every 0.1 ms, about every 0.2 ms, about every 0.3 ms, about every 0.4 ms, about every 0.5 ms, about every 0.8 ms, or about every 1 ms. In other embodiments, different time intervals can be implemented. In some embodiments, process monitors can be implemented on the system to evaluate performance, responsive to an implemented time interval. The system can automatically implement changes in time interval upon detection of, for example, a decrease in system performance.

On some operating systems, the operating system's virtual memory manager may pre-reserve space for private (copy-on-write) views, such as the protected view 106. A protected view is not directly accessed by the operating system. When the virtual memory manager pre-reserves space for protected views, an entire database file may be too large to map as private for the protected view 106. For example, a database file may be larger than the available RAM. In one embodiment, selected regions of the database may be copied to the protected memory-mapped view 106 and set to a private mode. For example, regions that are currently being written to may be set to a private mode. In one embodiment, the protected memory-mapped view 106 may be divided into small segments that are smaller than RAM. A segment may be, for example, 32 MB, 64 MB, 128 MB, 256 MB, or 512 MB. In other embodiments, different segment sizes can be implemented on the system.

A separate data structure may record which segments of the database are marked as private and copied in the protected view 106. Given a write command, or a write intent declaration, the data structure may be checked by the database system or the virtual memory manager to see if the segment or segments corresponding to the write range have already been marked as private. If not, the segments are then marked as private via some operating system specific API (Application Programming Interface). In one example, an operating system function may be called to mark a memory-mapped segment as private.

According to one aspect of the invention, user instructions may include operations that are not basic writes. For example, a user may execute a create file or delete file instruction. According to one embodiment, these types of user instructions are stored directly in the journal buffer 110 and then written to the journal 104. The instructions may also be performed on the memory-mapped files in the protected view 106.

Figure 4:
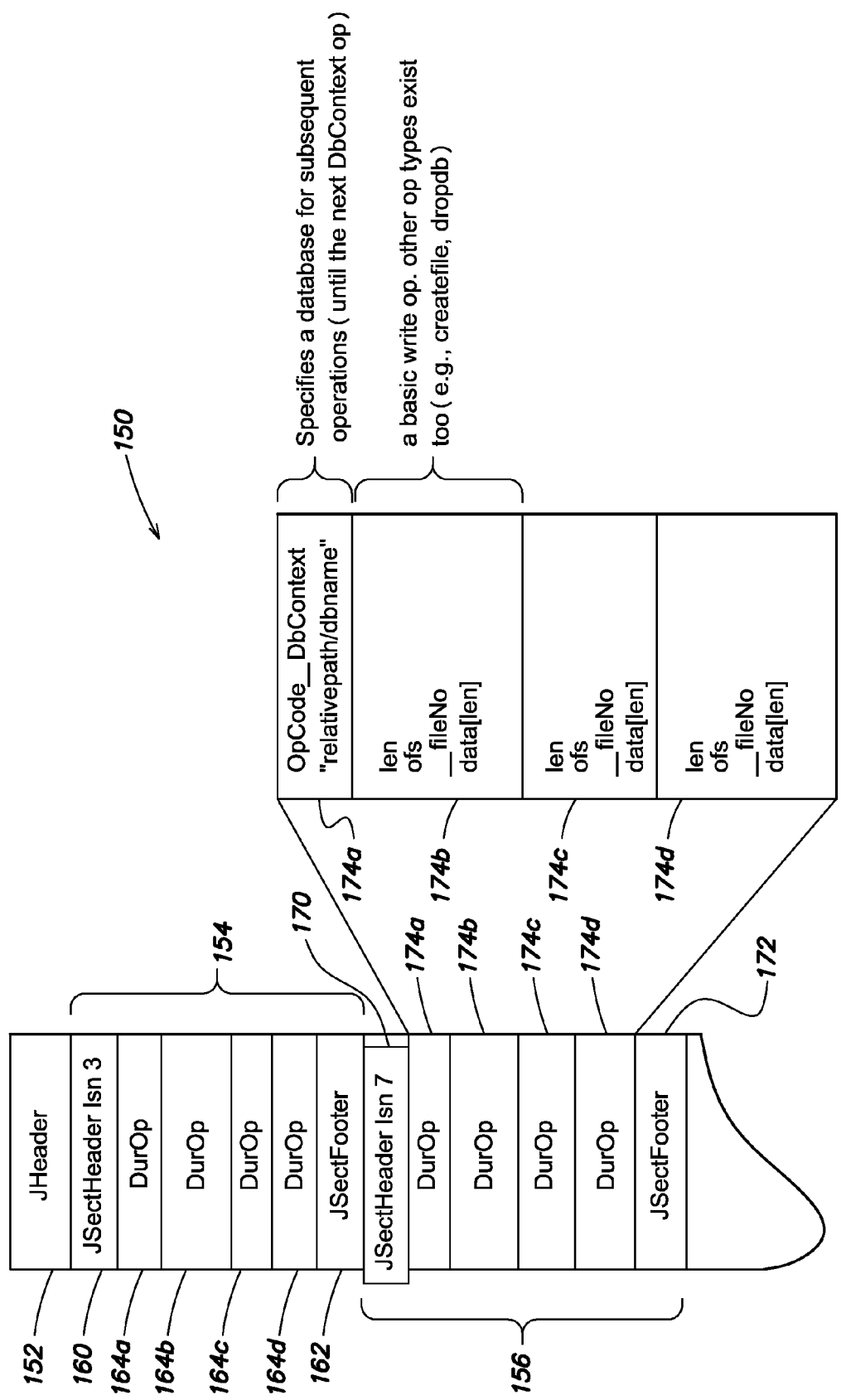
FIG. 4 is a block diagram of an example journal file entry according to aspects of the present invention.

FIG. 4 is a block diagram of an example journal file entry 150 including a header 152, a first section 154 and a second section 156, according to an embodiment of the invention. The first section 154 includes a section header 160, a set of information 164a-164d, and a section footer 162. The second section 156 includes a section header 170, a set of information 174a-174d and a section footer 172. According to one feature, if all the information in a section is present, including the section header, the section footer, and the set of information in between the header and footer, the section is entered in the journal 104. In one example, a section also includes a checksum, which is matched to an expected value before entry of the section into the journal 104.

The first section 154 represents one group commit, as defined above with respect to FIG. 2. If all the parts of the first section 154 are present, then the first section 154 is written to the journal 104 in a group commit. Similarly, the second section 156 represents one group commit and if all the parts of the second section 156 are present, then the second section 156 is written to the journal 104 in a group commit. Thus, the first 154 and second 156 sections each represent a group commit block which is written to the journal 104. A batch of group commit blocks is written to the journal 104 periodically. According to various examples, a batch of group commit blocks is written to the journal 104 about every 5 ms, about every 10 ms, about every 25 ms, about every 50 ms, about every 100 ms, about every 250 ms, about every 500 ms, or about every 1 second. According to one embodiment, a user may determine how frequently batches of group commit blocks are written to the journal 104.

According to one embodiment, the set of information 164a-164d or 174a-174d includes operations. According to one example, information item 174a specifies a database for subsequent operations and information item 174b is a basic write operation. In other examples, information items may include create file operations or delete operations. Generally, information items 164a-164d and 174a-174d include information regarding which datafile to access, the offset in the datafile to access, the number of bytes to be written, and the data to be written or otherwise changed at that location in the selected datafile.

Figure 5:
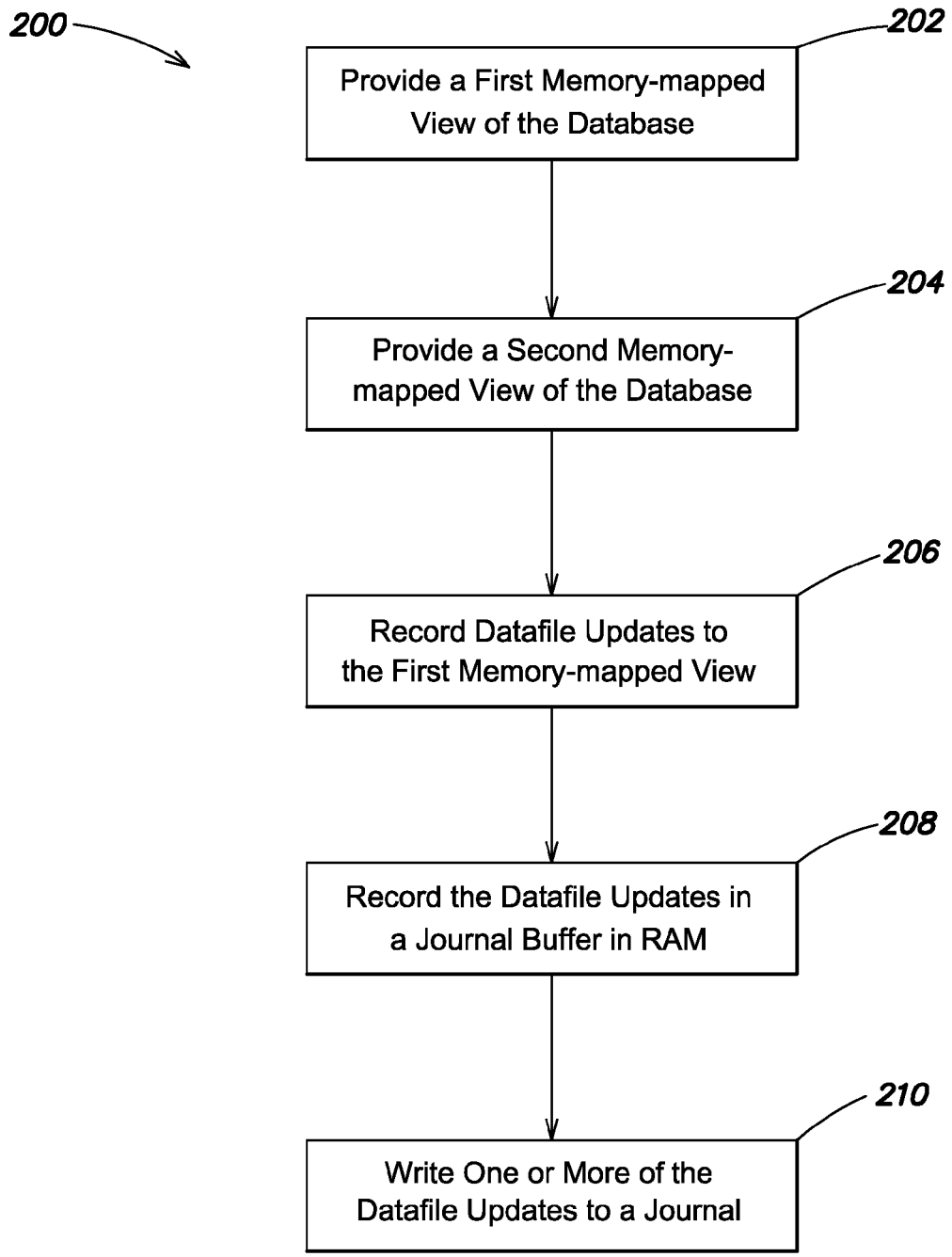
FIG. 5 is a flow chart of a method of creating durability in a memory-mapped database system according to one aspect of the present invention.

A method 200 for creating durability in a memory-mapped database system using two memory-mapped views and a journal is shown in FIG. 5. At step 202, a first memory-mapped view of a database is provided. The first memory-mapped view is a protected view, from which users may read data, and on which write commands are performed. At step 204, a second memory-mapped view of the database is provided. In one embodiment, the second memory-mapped view is a write only view. In an alternative embodiment, users may also read from the second memory-mapped view. At step 206, datafile updates are recorded to the first memory-mapped view. The datafile updates may be write commands entered by a user. At step 208, the datafile updates are recorded in a journal buffer. The journal buffer is stored in RAM. At step 210, one or more of the datafile updates are written to a journal. According to one feature, if multiple datafile updates are made to the same item of data in a datafile, only the most recent update to the datafile update is written to the journal.

A method 250 for performing a read operation in a memory-mapped database system including two memory-mapped views as described above is shown in the flow chart of FIG. 6. When the database system receives a read operation, at step 252, it checks whether the datafile to be read is in the memory-mapped files of the protected view. If the datafile is in the protected view, the read operation is performed on the memory-mapped file in the protected view at step 254. Thus, if the memory-mapped file in the protected view has been changed since it was uploaded from the database, and is not identical to the datafile in the database, the read operation returns data that has not been saved (or committed) to the database. Most often, the data in the memory-mapped views is copied to the database, but in some instances, the system may crash before the changes are saved to the database, and the read data will not accurately reflect data in the database.

Back at step 252, when the database system receives a read operation, if the datafile to be read is not in the memory-mapped files of the protected view, the database system may check if the datafile is in the write view at step 256. In some examples, the write view may include different datafiles from the protected view. In other embodiments, if the datafile to be read is not in the memory-mapped files of the protected view, the datafile is copied to the protected view at step 258 and then read from the protected view at step 254.

Figure 7:
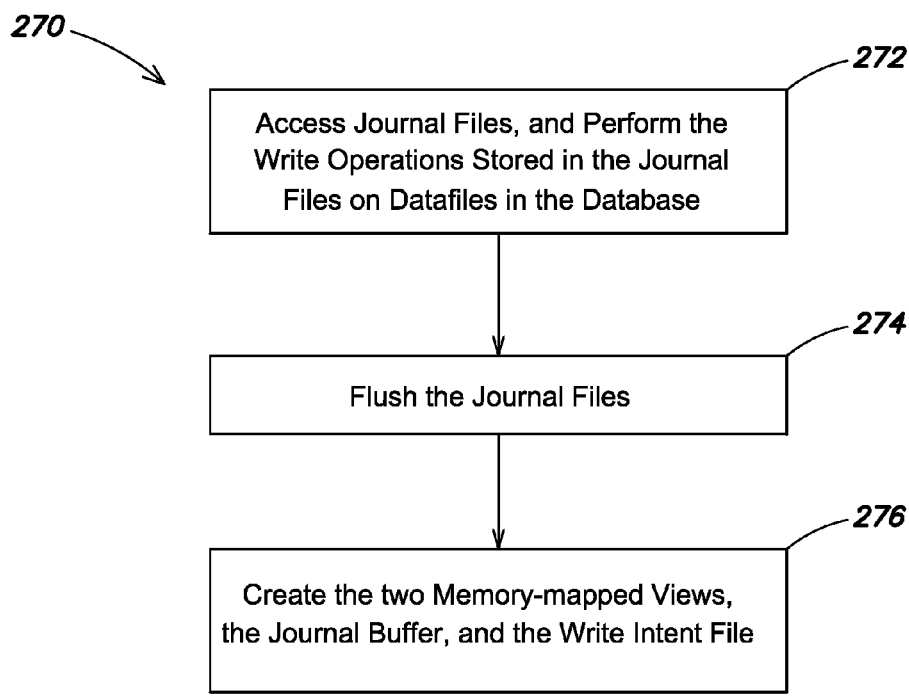
FIG. 7 is a flow chart of a method of recovering data written to a memory-mapped database following a system crash according to aspects of the present invention.

FIG. 7 shows a method 270 for recovering data written to the journal in a memory-mapped database system following a system crash, according to an embodiment of the present invention. After the system is restarted, at step 272, the database system accesses the journal files and performs the write operations stored in the journal files on the datafiles, saving the data in the journal to the database. After the database is updated with the data from the journal, at step 274, the journal files are flushed. At step 276, the memory-mapped database system creates the two memory-mapped views, the journal buffer and the write intent file.

Figure 8:
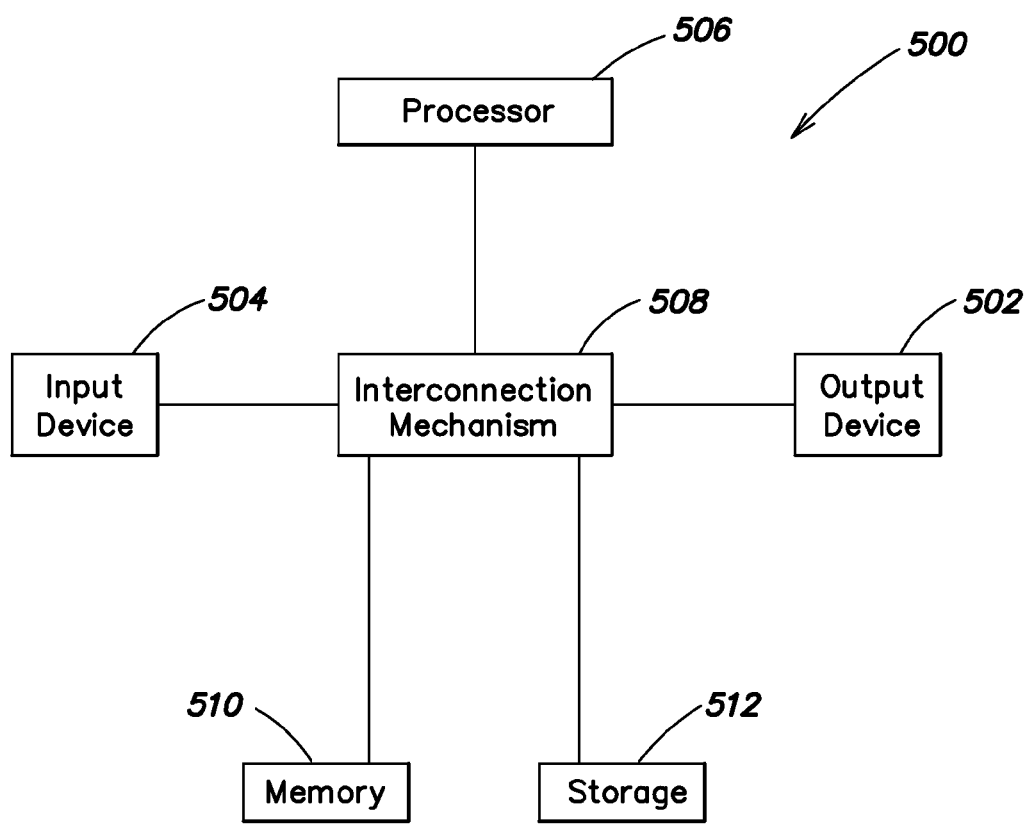
FIG. 8 is a block diagram of an example distributed database system on which various aspects of the present invention can be practiced.
Figure 9:
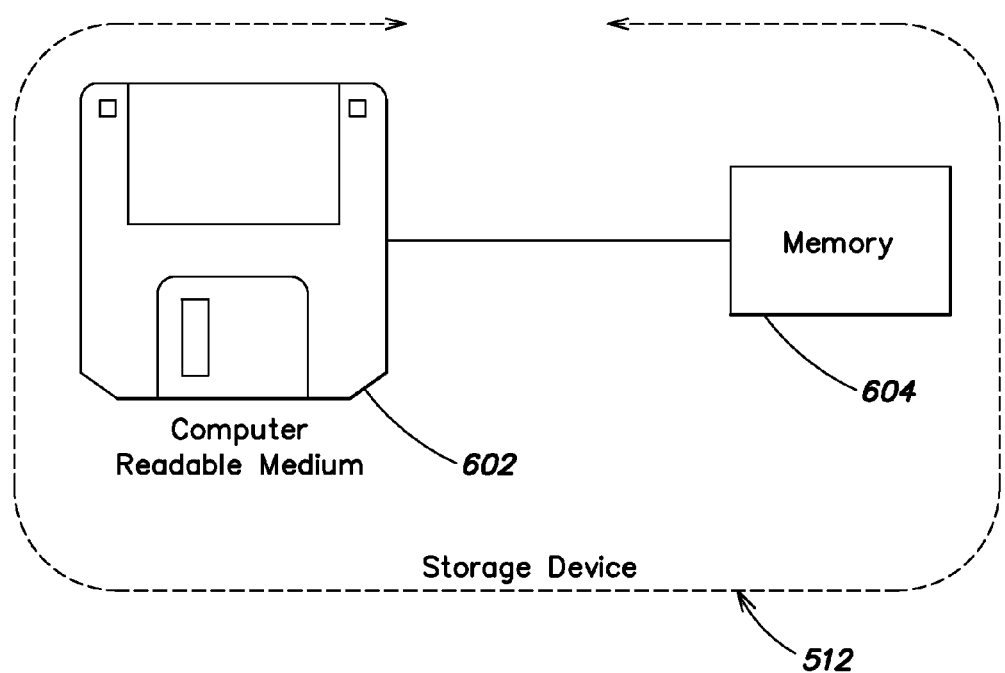
FIG. 9 is a block diagram of an example distributed database system on which various aspects of the present invention can be practiced.

The various processes described herein can be configured to be executed on the systems shown by way of example in FIGS. 8-9. The systems shown can be programmed to execute the processes and/or functions described. Additionally, other computer systems can be specially configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database or memory-mapped database system, including two views of memory-mapped files, a journal, a journal buffer, and a set of write intents. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to creating memory-mapped views of a database including memory-mapped files, writing to memory-mapped files, reading from memory-mapped files, recording write commands in a journal buffer, writing the journal buffer to a journal, storing a set of write intent locations, copying data from a first memory-mapped view to a second memory-mapped view, and writing data to a main database. The operations and/or algorithms described herein can also be encoded as software executing on hardware that define a processing component, that can define portions of a general-purpose computer, reside on an individual general-purpose computer, and/or reside on multiple general-purpose computers.

FIG. 8 shows a block diagram of an example general-purpose computer system 500 on which various aspects of the present invention can be practiced. For example, various aspects of the invention can be implemented as specialized software executing in one or more computer systems including general-purpose computer systems 704, 706, and 708 communicating over network 702 shown in FIG. 10. Computer system 500 may include a processor 506 connected to one or more memory devices 510, such as a disk drive, memory, or other device for storing data. Memory 510 is typically used for storing programs and data during operation of the computer system 500. Components of computer system 500 can be coupled by an interconnection mechanism 508, which may include one or more busses (e.g., between components that are integrated within a same machine) and/or a network (e.g., between components that reside on separate discrete machines). The interconnection mechanism enables communications (e.g., data, instructions) to be exchanged between system components of system 500.

Computer system 500 may also include one or more input/output (I/O) devices 502-504, for example, a keyboard, mouse, trackball, microphone, touch screen, a printing device, display screen, speaker, etc. Storage 512, typically includes a computer readable and writeable nonvolatile recording medium in which computer executable instructions are stored that define a program to be executed by the processor or information stored on or in the medium to be processed by the program.

The medium can, for example, be a disk 602 or flash memory as shown in FIG. 9. Typically, in operation, the processor causes data to be read from the nonvolatile recording medium into another memory 604 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 8, the memory can be located in storage 512 as shown, or in memory system 510. The processor 506 generally manipulates the data within the memory 510, and then copies the data to the medium associated with storage 512 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 500 is shown by way of example, as one type of computer system upon which various aspects of the invention can be practiced, it should be appreciated that aspects of the invention are not limited to being implemented on the computer system as shown in FIG. 8. Various aspects of the invention can be practiced on one or more computers having a different architectures or components than that shown in FIG. 8.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 500. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs which receive and process client requests, for example.

There can be other computer systems that show views of memory-mapped files from a main database, journal changes to the memory-mapped files, and write changes to the memory-mapped files back to the main database, among other functions. These systems can be distributed among a communication system such as the Internet. One such distributed network, as discussed below with respect to FIG. 7, can be used to implement various aspects of the invention.

Figure 10:
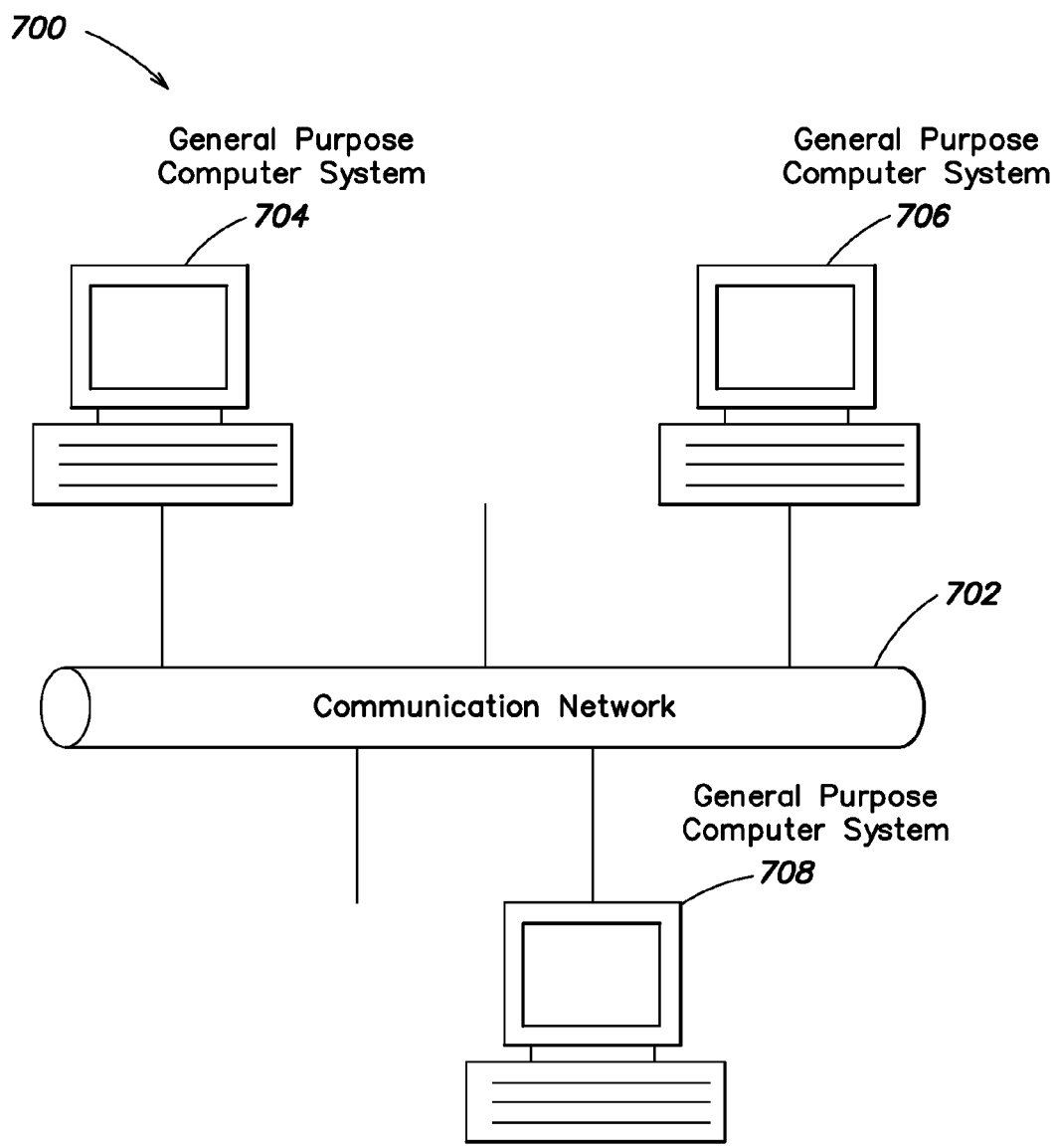
FIG. 10 is a block diagram of an example distributed database system on which various aspects of the present invention can be practiced.

FIG. 10 shows an architecture diagram of an example distributed system 700 suitable for implementing various aspects of the invention. It should be appreciated that FIG. 7 is used for illustration purposes only, and that other architectures can be used to facilitate one or more aspects of the invention.

System 700 may include one or more specially configured general-purpose computer systems distributed among a network 702 such as, for example, the Internet. In one example, client computer systems can interface with computer systems 704-708 via an Internet-based interface.

In another example, a system 704 can be accessed through a browser program such as the Microsoft Internet Explorer application program, Mozilla's FireFox, or Google's Chrome browser through which one or more websites can be accessed. Further, there can be one or more application programs that are executed on system 704 that perform functions associated with responding to client interactions. For example, system 704 may include one or more local databases

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," " third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer-implemented method for creating durability in a memory-mapped database system, comprising acts of:
   instantiating, in a memory space managed by an operating system of a computer system, a first memory-mapped view of a database, wherein the first memory-mapped view is a protected view, wherein the act of instantiating includes an act of protecting the first memory-mapped view of the database from one or more management operations of the operating system, wherein the act of protecting includes preventing synchronization between data-files in the first memory-mapped view and associated data-files on disk;
   instantiating, on the computer system, a second memory-mapped view of the database in the managed memory space, wherein the second memory-mapped view is a write view configured to accept database operations written to the first protected memory-mapped view;
   receiving at least one write command from at least one user;
   executing the at least one write command on at least one respective datafile in the first protected memory-mapped view, in response to receiving the at least one write command from the at least one user;
   recording at least one update associated with the at least one write command to a journal buffer in random access memory;
   writing, after a first time interval, the at least one update in the journal buffer to a journal;
   performing, responsive to writing the at least one write to the journal, the at least one update on at least one datafile in the second memory-mapped view; and
   copying updates made on the second memory-mapped view to the database.

2. The computer-implemented method of claim 1, further comprising recording a plurality of write intents indicating at least one updated file location corresponding to the at least one write command executed on the at least one respective datafile.

3. The computer-implemented method of claim 1, wherein the update comprises datafile updates to a single datafile, and recording the at least one update to the journal comprises writing the single datafile to the journal.

4. The computer-implemented method of claim 1, wherein the first protected memory-mapped view of the database is a readable view.

5. The computer-implemented method of claim 1, wherein the second memory-mapped view of the database is a write-only view.

6. The computer-implemented method of claim 1, wherein the first protected memory-mapped view of the database includes a portion of datafiles in the database, and further comprising updating the datafiles included in the first protected memory-mapped view of the database.

7. The computer-implemented method of claim 1, further comprising providing an acknowledgement after writing the at least one update to the journal.

8. The computer-implemented method of claim 1, wherein the journal is copied to physical storage.

9. The computer-implemented method of claim 1, further comprising mapping at least a portion of datafiles included in the first protected memory-mapped view resident in active memory of the computer system with at least a respective portion of datafiles resident on physical storage.

10. The method according to claim 1, wherein protecting the first memory-mapped view of the database from the one or more management operations of the operating system includes limiting transition of datafiles resident in active memory to physical storage by the operating system.

11. The computer-implemented method of claim 1, further comprising:
   recording the at least one datafile update to the second memory-mapped view from a journal copy; and
   updating the database with the at least one update to the second memory-mapped view.

12. The computer-implemented method of claim 1, further comprising:
   saving a location corresponding to the at least one write command executed on the at least one respective data file to a write intent file; and
   saving the at least one update from the first protected memory-mapped view to a journal buffer.

13. The computer-implemented method of claim 1, wherein executing at least one write command on at least one respective datafile in the first protected memory mapped view comprises executing the at least one write command on the at least one respective datafile in random access memory.

14. The computer-implemented method of claim 1, further comprising remapping the first protected memory-mapped view subsequent to executing the at least one write command.

15. A durable memory-mapped database system including at least one processor operatively connected to a memory, the system comprising:
- an operating system managed memory space within the memory;
- a first memory-mapped view of a database instantiated in the operating system managed memory space including copies of a plurality of datafiles from the database, wherein the first memory-mapped view is a protected view configured to protect the first memory-mapped view from management by the operating system, wherein the first memory-mapped view is configured to accept a plurality of data file updates including write operations received on the plurality of data files, and wherein management by the operating system includes synchronization between data-files in the first memory-mapped view and associated data-files on disk;
- a second memory-mapped view of the database instantiated in the operating system managed memory space including copies of the plurality of datafiles, wherein the second memory-mapped view is a write view configured to accept database operations written to the first protected memory-mapped view;
- a journal buffer in random access memory configured to record datafile updates from the first protected memory-mapped view, including write operations received on the plurality of datafiles;
- a journal configured to periodically receive recorded datafile updates from the journal buffer; and wherein the system is configured to:
- execute at least one write command, in response to receiving the at least one write command from at least one user, on at least one datafile in the first protected memory-mapped view,
- record the at least one write command to the journal in response to the execution of the write command,
- update at least one datafile in the second memory-mapped view associated with the write command in response to recording the write command to the journal, and
- copy updates made on the second memory-mapped view to the database.

16. The durable memory-mapped database system of claim 15, further comprising a write intent file configured to record at least one updated file location corresponding to the at least one write command executed on the at least one respective datafile.

17. The durable memory-mapped database system of claim 15, wherein the first protected memory-mapped view is a copy-on-write view.

18. The durable memory-mapped database system of claim 15, wherein the first and second memory-mapped views are stored in a file system cache.

19. The durable memory-mapped database system of claim 15, wherein the journal is stored in a page cache.

* * * * *